United States Patent Office 3,426,380
Patented Feb. 11, 1969

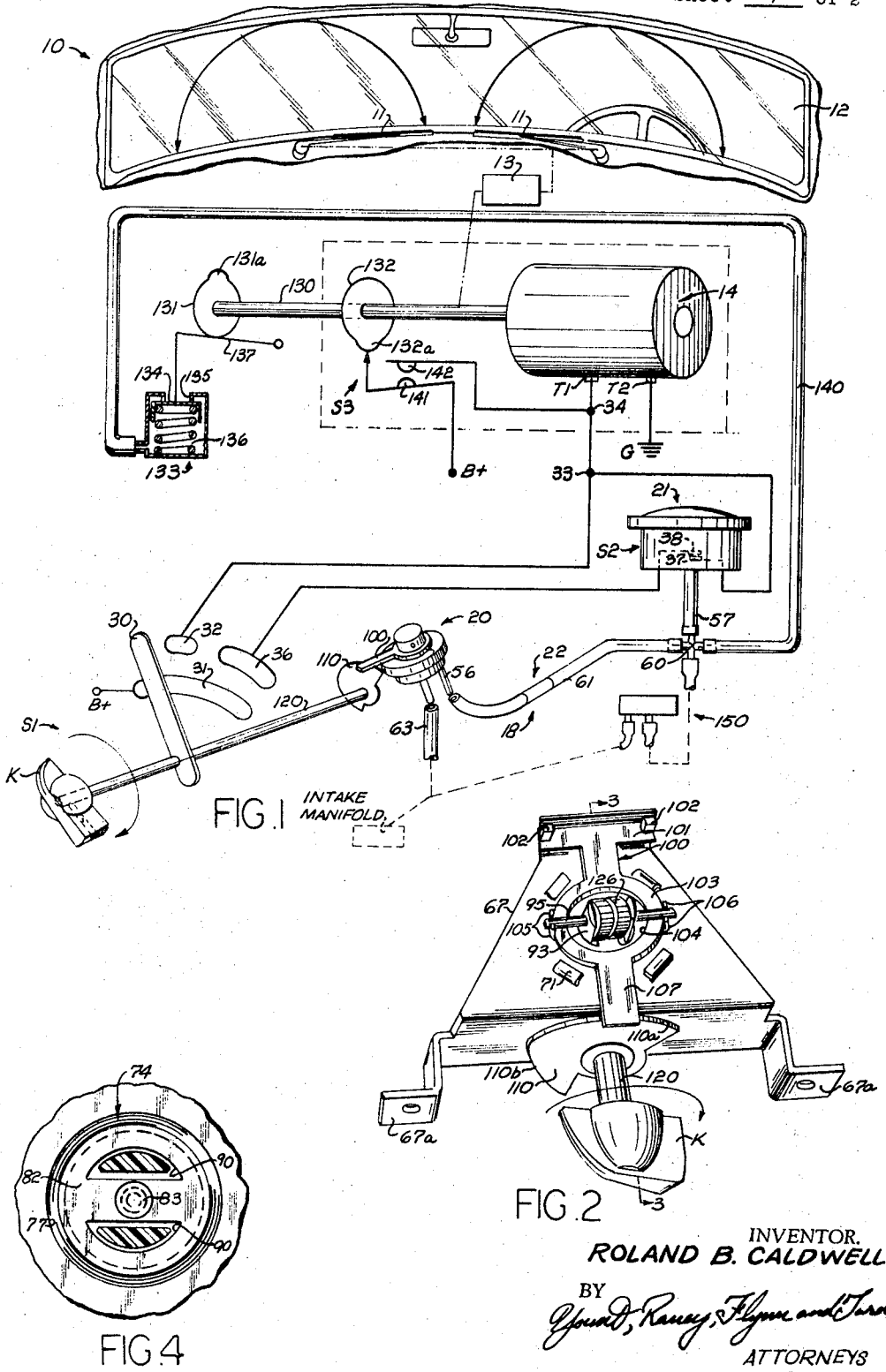

3,426,380
VARIABLE TIME DELAY MECHANISM
Roland B. Caldwell, Worthington, Ohio, assignor to Ranco Incorporated, Franklin County, Ohio, a corporation of Ohio
Filed Mar. 17, 1967, Ser. No. 623,985
U.S. Cl. 15—250.12                                        16 Claims
Int. Cl. A47l 1/02; B60s 1/12

ABSTRACT OF THE DISCLOSURE

Windshield wipers 11 of an automotive vehicle are driven by an electric motor 14 controlled by switch 53 to break the motor circuit following each oscillation of the blades. The motor circuit is remade around the open switch 53 to initiate a succeeding oscillation by closing of a switch S2, which is normally open and is closed by a time delay 21 including a switch actuator 43 movable through a given stroke to actuate the switch by fluid pressure differentials established by an adjustable regulator 20, including adjusting knob K, the degree of vacuum determining the rate of movement of the member through its stroke. The actuator 43 is returned to its starting position of the switch actuating sroke by opening of valve 134 operaed by cam 131 during oscillation of the blades by the motor.

---

The present invention relates to a time delay mechanism for intermittently initiating operation of a servomechanism such as a windshield wiper drive for providing an adjustably variable frequency of wiper strokes.

A principal object of the invention is the provision of a new and improved vacuum pressure operated time delay mechanism which provides for variably controllable intervals between cyclic operation of a windshield wiper of an automobile vehicle.

Another object of the present invention is the provision of a new and improved time delay mechanism for effecting operation of a servomechanism at controllable intervals comprising a pressure regulator means connected to a source of fluid pressure and operable to provide variably controllable pressure at an output port thereof, a variable volume chamber communicating with the output port of the regulator means through a conduit which includes a flow restrictor so that pressure at the output port of the regulator and in the variable volume chamber are gradually equalized, an actuating member associated with a movable wall portion of the chamber and movable to a position wherein operation of the servomechanism is initiated, and valve means communicating with the chamber and operated by the servomechanism to vent the chamber and permit movement of the actuating member away from its aforementioned position.

Still another object of the present invention is the provision of a new and improved vacuum pressure operated time delay mechanism of the type referred to wherein the actuating member forms part of a switch which is closed when the member is in its aforementioned position so as to complete an energizing circuit for an electrically driven motor and with the motor operable to open the valve means to vent the chamber and reclose the valve means to reset the time delay and wherein a second switch is provided which is closed upon operation of the motor to maintain the motor energized during completion of an operating cycle thereof and after the time delay has been reset.

A still further object of the present invention is the provision of a new and improved windshield wiper for an automotive vehicle which comprises a wiper blade cyclically movable on a windshield of the vehicle, means drivingly connected to the wiper blade which comprises an electrically energized motor, first switch means closed to initiate energization of the motor and opened during part of the cycle of the wiper blade, a second switch means operated from the motor which is closed during the cycle of the wiper blade so as to maintain the motor energized and opened when the blade completes the cycle, and vacuum pressure operated actuating means for reclosing the first swicth means to reenergize the motor a predetermined interval after completion of a preceding cycle, and with the predetermined interval between cycles being of uniform duration over a wide range of speeds of the vehicle engine.

Additionally, the present invention provides a new and improved windshield wiper mechanism of the type described wherein an intermittently operating windshield wiper is automatically continuously operated when the vehicle is accelerated and with the wipers resuming their intermittent operation when the vehicle is no longer accelerated.

Other objects and advantages of the present invention will become apparent from the following detailed description thereof made with reference to the accompanying drawings which form a part of the specification and wherein:

FIG. 1 is a schematic illustration of a windshield wiper assembly embodying the present invention;

FIG. 2 is a perspective illustration of a portion of the windshield wiper assembly of FIG. 1;

FIG. 4 is a fragmentary sectional view taken approximately at line 4—4 of FIG. 3;

Figure 3:
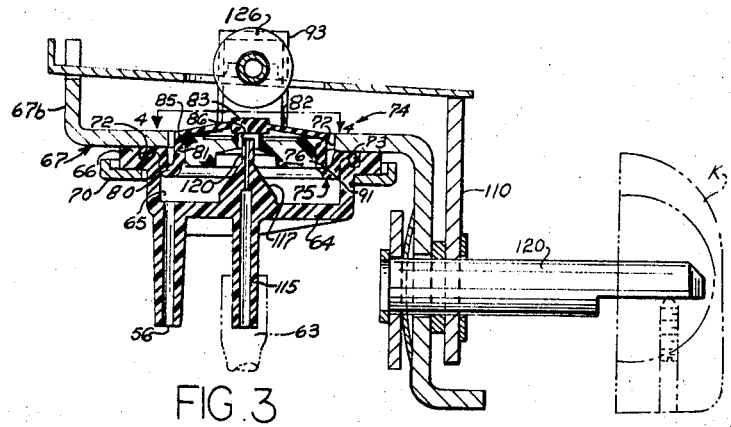
FIG. 3 is a sectional view taken approximately at lines 3—3 of FIG. 2.

A windshield wiper 10 embodying the present invention is illustrated in FIG. 1 and includes a pair of windshield wiper blades 11 which are cyclically movable in an accurate path along a windshield 12 of an automotive vehicle, only a part of which is shown, by an actuating mechanism 13 which is driven by an electrically energized DC motor 14. The motor 14 is connectable across the terminals of a DC power supply, such as a battery of the vehicle, by manual operation of a control switch S1 which is positionable to provide for continuous operation of the motor 14 to continuoulsy drive the blades 11 and to provide for intermittent cyclic operation of the motor 14 under weather conditions wherein continuous cycling of the blade 11 is not necessary or desirable. The switch S1 is illustrated in its "OFF" position. With the switch S1 in its intermittent run position, energization of the motor 14 is controlled by a time delay mechanism 18 including a pressure regulator means 20 connected to a source of vacuum pressure at the engine of the vehicle, not shown, and operable to provide a regulated controllable vacuum pressure at an output port thereof, means 21 forming a variable volume chamber communicating with the pressure regulator 20 through a flow restrictor 22, and switch means S2 positioned within the variable volume chamber.

During operation of the vehicle under atmospheric conditions wherein it is desirable to operate the windshield wipers thereof continuously, such as during heavy precipitation, the control switch S1 is moved from its "OFF" position to a position wherein a moving contact 30 thereof bridges the fixed contacts 31, 32 to complete an energizing circuit for the motor 14 from the battery terminal B+ through the fixed contact 31, moving contact 30, contact 32, a junction 33, junction 34, motor terminal T1, through the windings of the motor 14, motor terminal T2 to the ground terminal G of the power supply. Movement of the contact 30 is effected by manual rotation of a control knob K drivingly connected to the contact 30 and preferably positioned on the dash panel of the vehicle in a location convenient to the operator.

When conditions are such that continuous operation of the wiper blades 11 is not desirable or necessary, the knob K is manually rotated to move the contact 30 along the contact 31 and into engagement with a contact 36 to establish an energization circuit for the motor 14 from the battery terminal B+, through the contact 30, contact 31, contact 36, contacts 37, 38 of the switch S2, the junctions 33, 34, terminal T1 of the motor 14, the windings of the motor, terminal T2 and to the ground terminal G of the power supply. When the moving contact 30 engages the fixed contacts 31, 36, it is apparent that energization of the motor 14 is controlled by operation of the switch S2 which is a conventionally constructed snap acting switch (see FIG. 5) supported within the chamber forming means 21. A snap switch of the type illustrated is described in United States Patent No. 2,651,690 to which reference should be made for a more complete description.

Figure 5:
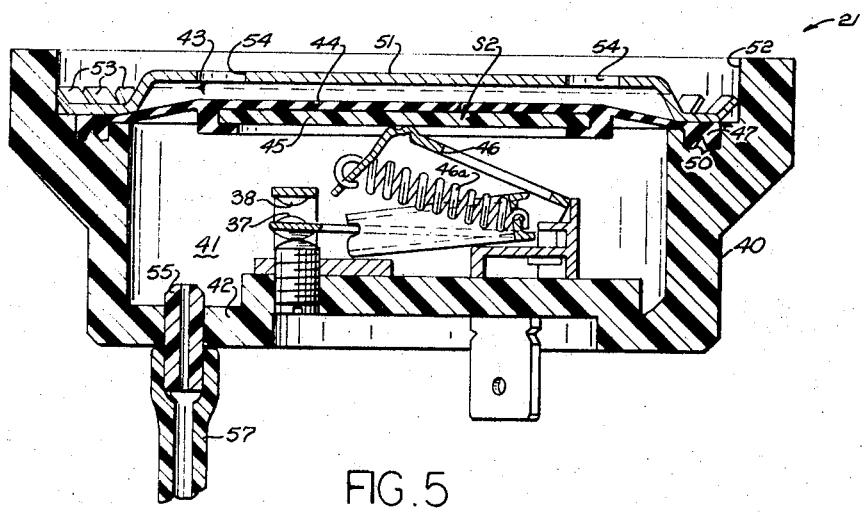
FIG. 5 is a fragmentary sectional view of another portion of the windshield wiper assembly of FIG. 1 and on a larger scale.

As illustrated in FIG. 5, the means 21 includes a generally cylindrical body member 40 having a cavity 41 therein with a bottom wall (as viewed in the drawings) which supports the switch S2. The cavity 41 is closed at its upper end by a diaphragm assembly 43 which includes a flexible rubber-like diaphragm member 44, and a rigid plastic disc member 45 supported by the diaphragm at its central portion for movement therewith into engagement with an actuating member 46 of the switch S2. The actuating member 46 is connected to a coil spring 46a which urges the member 46 continuously against the diaphragm assembly 43 and tends to maintain the diaphragm assembly in its position illustrated in FIG. 5. The periphery of the diaphragm member 44 is formed by a thickened lip portion 47 which is sealingly engaged with the walls of grooves 50 formed in the body member 40 and held in sealing engagement therewith by a disc-like retainer member 51 which is forcibly inserted into a cylindrical opening 52 at the upper part of the body member 40, as viewed in the drawings, and which includes a plurality of teeth 53 which dig into the material of the body member so as to prevent loosening of the retainer member 51 by vibration or other loosening forces. The retainer member 51 includes a plurality of perforations 54 therein for communicating the upper side of the diaphragm assembly 43, as viewed in FIG. 5, to atmospheric pressure.

A tubular fitting 55 extends through the bottom wall 42 of the body member 40 and communicates the chamber 41 with an output port 56 of the regulator means 20 through a flexible conduit comprising a rubber-like tube 57, a suitable coupling 60 and to the output port of the regulator 20 through a flow passage 61 including the restrictor 22 (see FIG. 1).

Upon establishment of a sub-atmospheric pressure within the chamber 41, the diaphragm assembly 43 moves into the chamber against the action of the spring 46 as and when a predetermined pressure differential has been established across the diaphragm assembly, the contacts 37, 38 of the switch S2 are abruptly closed, and are held closed as long as the pressure differential across the diaphragm is maintained. When the pressure differential across the diaphragm is decreased to approximately zero, the force of the spring 46a, acting through the actuating member 46, urges the diaphragm assembly upwardly, as viewed in the drawings, resulting in abrupt opening of the contacts 37, 38, and positioning of the diaphragm assembly substantially in its position illustrated in FIG. 5.

The pressure regulator means 20 is connected to a source of vacuum pressure at the engine intake manifold, shown schematically, through a suitable vacuum source conduit 63 and is constructed to produce a regulated, sub-atmospheric pressure at the output port 56, which, for a given setting of the regulator 20 as will be described, remains substantially constant regardless of engine speed and consequent changes of pressure at the vacuum source. The regulator means 20 includes a generally cylindrical housing member 64 formed of suitable plastic material having a cylindrical chamber 65 formed therein and a radially extending flange portion 66 adjacent the upper end of the chamber which is maintained in engagement with a suitable bracket 67 by a clamping member 70 which surrounds the flange portion 66 and includes upwardly extending tabs 71 which project through suitable openings in the bracket member 67 and are peened over so as to maintain the housing 64 in closely spaced relation to the lower side of the bracket 67 substantially as shown in FIGS. 2 and 3. The bracket 67 is constructed for mounting behind the dash panel of the vehicle with the knob K projecting into the passenger compartment through the dash panel, and includes mounting flange portions 67a for this purpose. The flange 66 of the housing 64 includes a sealing groove 72 facing the lower side of the bracket 67 which receives a thickened peripheral lip portion 73 of a diaphragm assembly 74 so that when the housing 64 is secured to the bracket 67 as described, an air tight seal is formed between the flange 66, the lip 73 of the diaphragm assembly 74, and the lower side of the bracket 67.

The diaphragm assembly 74 includes a flexible rubber-like diaphragm member 75 which is constructed to support a rigid disc-like member 76 for movement therewith relative to the housing 64 in a manner which will be described. The central portion of the diaphragm assembly 74, in its position shown in FIG. 3, projects upwardly into an aperture 77 formed in the bracket 67 so as to be exposed to atmospheric pressure surrounding the bracket 67. The diaphragm member 75 includes a flexible annular corrugation 80 extending into the chamber 65 between the flange 66 and the disc-like member 76 and which flexes to permit movement of the diaphragm assembly 74 axially in the chamber 65. The diaphragm 75 is formed having a radially inwardly projecting circular flange 81, a generally flat annular end wall 82 spaced axially from the flange portion 81, and a generally cylindrical button-like valve closure 83 formed integrally in the end portion 82.

The flange portion 81 and end wall 82 tightly engage opposite axial sides of a circular, radially projecting flange 85 of the disc member 76 to form the aformentioned support for the disc member and provide an airtight seal about its periphery. The valve closure 83 is formed of a thickened diaphragm material and is resiliently urged into engagement with a raised valve port 86 on the disc member 76 by a slight stretching of the material of the wall 82 when the disc and diaphragm members are assembled. The valve closure 83 and the port 86 control the flow of atmospheric air to the chamber 65 in a manner to be described. The valve closure 83 is urged into sealing engagement with the port 86 due to its relative thickness and because of pressure differentials acting thereon as will be described.

With the parts of the diaphragm assembly 74 in their positions described above it is apparent that the chamber 65 is hermetically sealed from atmospheric pressure so that the chamber 65 forms a manifold communicating with the output port 56. It is also apparent that the upper side of the diaphragm assembly 74 as viewed in the drawings, is exposed to atmospheric pressure surrounding the bracket 67. As illustrated in FIG. 4, the disc member 76 is also exposed to atmospheric pressure by virtue of semi-circular apertures 90 formed in the end wall 82 of the diaphragm member 75.

The disc member 76 includes a generally frustoconical recess formed centrally therein and into which the port 86 opens. The upper side of the member 76 includes a pair of upwardly extending arms 93 which are integrally formed with the member 76 and extend through the apertures 90 in the diaphragm member 75 and the aperture 77 in the bracket 67. The arms 93 include aligned openings therein which snugly receive a pin 95. Opposite ends of the rod 95 are supported by a flat spring member 100 having a first end 101 connected to an upwardly extending flange portion 67b of the bracket 67. The flange portion 67b includes upstanding projections 102, at opposite sides of the spring 100 and which projection interfit with similarly configured slots in the spring end 101 so that the spring 100 is supported in cantilever fashion against rotation about its end 101 with respect to the bracket.

The spring 100 is formed of a sheet of spring-like material and includes an enlarged generally circular portion 103 spaced from the end portion 101, which portion has a generally circular aperture 104 therein through which the arms 93 extend. A suitable cover, not shown, may be provided for the diaphragm assembly, and which is generally cylindrical in shape and surrounding the arms 93 and also extending through the aperture 104. The central portion 103 of the spring 100 includes upwardly extending pairs of tabs 105, 106 at diametrically opposed sides thereof between which the ends of the rod 95 are positioned. The free end 107 of the spring 100 is biased against the periphery of a cam member 110, which is described hereinafter, so that the spring 100 resiliently urges the diaphragm assembly 74 upwardly relative to the housing 65 with a force which varies according to the angular positioning of the cam.

The vacuum source at the vehicle engine is communicated to the chamber 65 in the housing 64 through a tubular connector 115 connected to the conduit 63 from the vacuum source at the engine and through a nipple-like fitting 116 which is formed integrally with the housing 64 and extends centrally through the chamber 65 and which includes a frusto-conical portion 117 and a stem 120. The stem 120 is of smaller diameter than the port 86 and is coaxial and is adapted to extend through and beyond the port 86 when the diaphragm assembly 74 moves downwardly into the chamber 65. The open end of the stem 120 is engageable with the valve closure 83 of the diaphragm member 75 and when the valve and stem are so engaged, the passage through the fitting 116 to the vacuum source is sealed off from the chamber 65 preventing further evacuation thereof. When the valve 83 and the end of the stem 120 are disengaged, the chamber 65 is exposed to the pressure at the vacuum source to decrease the pressure within the chamber.

When the parts of the vacuum regulator 20 are in their position shown in FIG. 3, the chamber 65 is exposed to the vacuum pressure at the source and provides a vacuum pressure at the output port 56 which is higher than the absolute pressure at the vacuum source, but lower than atmospheric pressure. Due to the restricted opening through the stem 120 the pressure in the chamber 65 is somewhat gradually reduced toward the pressure of the vacuum source and a differential pressure force is developed across the diaphragm assembly 74 in response to such change in pressure in the chamber 65. When the presure in the chamber has been reduced to a particular level, the atmospheric pressure acting on the upper side of the diaphragm assembly 74 urges the assembly into the chamber to effect sealing engagement between the valve 83 and the stem 120. It should be apparent that when the valve 83 and tubular portion of the fitting 116 are engaged, further downward movement of the valve 83 is prevented by the stem 120, but since the atmospheric pressure continues to act on the upper surface of the disc member 76 by way of the apertures 90, the disc member 76 continues to move downwardly into the recess and the port 86 moves out of sealing engagement with the valve 83 to introduce air at atmospheric pressure into the chamber 65.

From the description above, it is apparent that when the diaphragm assembly 74 moves into the chamber 65 the pressure force exerted by the air in the chamber and the upwardly acting spring force of the spring 100 are overcome by the downwardly acting pressure force created by the atmospheric air on the diaphragm assembly 74 so that the diaphragm assembly is moved downwardly. When the disc member 76 is moved out of sealing engagement with the valve 83, the pressure force within the chamber in conjunction with the upwardly acting spring force of the spring 100 tends to overcome the atmospheric pressure at the upper side of the diaphragm assembly to move the diaphragm assembly upwardly relative to the housing so that the parts are again in their positions shown in FIG. 3. Operation of the regulator has been exaggerated somewhat for the purposes of description and in practice the diaphragm assembly 74 "floats" or "flutters" in response to the changing pressures thereon to produce the aforementioned regulated pressure at the output port 56.

The pressure at the output port 56 is dependent upon the upwardly acting spring force exerted thereon by the spring 100, and can be controlled by changing the upwardly acting force of the spring by rotation of the aforementioned cam 110. The cam 110 is suitably connected to a shaft 120 upon which the knob K is mounted so that the tension of the spring 100 is changed as the knob K is rotated. Rotation of the knob K in a clockwise direction, as viewed in FIG. 3, causes the surface of the cam 100 to move the free end 107 of the spring 100 downwardly to decrease the spring force acting on the diaphragm assembly 74 and having the effect of increasing the output pressure at the port 56. When the knob K is rotated counter-clockwise, the spring tension is increased so as to decrease the pressure at the output port 56. The cam 110 preferably includes a constant radius portion 110a which flexes the spring 100 to produce a minimum pressure at the output port when the knob K is in its "off" position or has been turned to its continuous run position. The constant radius portion 110a extends around the periphery of the cam distance sufficient to maintain the minimum pressure at the output port when the knob K is moved to its intermittent run position wherein the contact 30 engages the left end of the contact 36, as viewed in FIG. 1. With the contacts 30, 36 engaged as described, the windshield wiper blades operate intermittently with a minimum delay between sweeps of the blades.

The cam member 110 additionally includes a decreasing radius portion 110b continuous with the portion 110a and which permits the spring 100 to be gradually relaxed as the knob K is rotated clockwise in the intermittent run position. Reduction of the spring force increases the pressure at the output port and when the contact 30 of the switch S1 is moved to the right end of the contact 36, the pressure at the output port is relatively high and the delay between sweeps of the blades 11 is maximized.

Under certain conditions, the diaphragm assembly 74 tends to flutter at relatively high frequencies and may produce an undesirable noise. It has been found that by providing a weight, or weights, generally indicated at 126, supported on the rod 95, the dynamic mass of the diaphragm assembly 74 is increased sufficiently to dampen such vibration and substantially eliminate any noise which might otherwise be created by the flutter thereof. In the illustrated embodiment, the weights 126 are disclike members having apertures therethrough which are supported on the rod 95 between the arms 93.

When the knob K has been positioned in an "intermittent run" position with a particular spring force applied on the spring 100 by the cam 110, the pressure at the output port 56 is communicated to the chamber 41 of the chamber means 21 through the flow restrictor 22 to thereby produce a gradually increasing differential across the diaphragm assembly 43 of the chamber forming means 21 so as to move the diaphragm assembly into the chamber as described above. After a predetermined time which is governed by the pressure at the output port 56 and the flow restricting characteristics of the flow restrictor 22, the contacts 37, 38 of the switch S2 are closed to complete the aforementioned energization circuit for the motor 14.

Energization of the motor 14 produces rotation of an output shaft 130 thereof which is connected to the windshield wiper blade 11 through the mechanism 13 by a suitable linkage, not illustrated in detail, and additionally effects rotation of cam members 131, 132 which are fixedy supported on the shaft 130. The cam member 131 cooperates with valve means 133 (see FIG. 1) which includes a valve camber open to atmosphere through a port 135 which is adapted to be closed by a valve member 134 urged into sealing engagement with the port by a compression spring 136. The valve member 134 is actuated to open the port by a linkage 137 including a cam following portion so that when the lobe 131a of the cam 131 engages the linkage 137, the valve member 134 is moved out of engagement with its seat 135 against the action of the spring 136. The valve chamber of means 133 communicates with the chamber 41 through a suitable conduit 140 which is connected between the valve means 133 and the T joint 60, and when rotation of the motor moves the lobe 131a of the cam 131 into engagement with the cam follower portion of the linkage 137, the valve member 134 moves downwardly away from the valve seat 135 to vent the chamber 41 to atmosphere and thereby reduce the pressure differential on opposite sides of the diaphragm 44 to zero, whereupon the contacts 37, 38 of the switch S2 are opened, thereby interrupting the energization circuit for the motor 14.

Continued rotation of the shaft 130 moves the lobe 131a of the cam member 131 out of engagement with the linkage 137 and the valve member 134 is urged into sealing engagement across the port 135 by the spring 136. Seating of the valve member 134 across the port 135 interrupts communication between the chamber 41 and atmospheric air pressure to reset the time delay mechanism for a succeeding cycle of the windshield wiper. From the foregoing, it will be recognized that the time delay period begins when the valve member 134 closes on its seat and that the point in the cycle of the wiper blades when the time delay period is initiated can be controlled by design of the cam 131.

In the illustrated embodiment, the motor 14 is maintained energized after opening of the contacts 37, 40 of the switch S2 by a holding circuit completed from the terminal B+ of the power supply through contacts 141, 142 of a switch S3, the junction 34, motor terminal T1, windings of the motor, motor terminal T2 and to the ground terminal G of the power supply. As illustrated in FIG. 1, the contact 141 of the switch S3 is a flexible contact strip which rides on the periphery of the cam member 132 and is actuated thereby so that the switch S3 is open when the wiper blades 11 are in their park positions and closed during operation of the motor 14. When the wiper blades 11 are in their park positions the lobe 132a of the cam 132 engages the moving contact 141 of the switch S3 to open the contacts, and when the motor 14 is energized through the switch S2 as described, the cam 132 rotates and the lobe portion 132a moves out of engagement with the moving contact 141 of the switch S3 to close the contacts 141, 142 and maintain the motor 14 energized until completion of a cycle of operation of the blades 11, regardless of whether the contacts 37, 38 of the switch S2 are closed.

Operation of the windshield wiper 10 should be apparent from the foregoing description. When weather or road conditions are such that intermittent operation of the windshield wiper is desirable, the control knob K is shifted to a desired intermittent run position by rotation in a clockwise direction as viewed in FIG. 1. When the knob K is rotated to this intermittent run position from its "OFF" position, it is apparent from the description above that due to the construction of the cam 110, a minimum pressure exists in the chamber 41 which is sufficient to close the contacts 37, 38 of the switch S-2 and initiate an immediate cycle of the wiper blades, as the contact 30 moves into engagement with the fixed contact 36. It should be noted that the above mentioned minimum pressure in the chamber 41 is maintained at all times when the knob K is in its "OFF" position so that the contacts 37, 38 of the switch S-2 are always closed when the contacts 30, 36 of the switch S-1 are initially engaged thus producing an immediate initial sweep of the blades 11. During the initial cycle of the blades 11 the chamber 41 of the chamber means 21 is vented by the valve 133 and when the valve 133 is reclosed, the time delay period prior to the next cycle of the blades is begun.

When the valve 133 closes, the chamber 41 is exposed to the pressure at the output port 56 of the vacuum regulator 20 through the flow restrictor 22 which gradually evacuates the chamber at a rate which is determined by the pressure at the output port 56. When the chamber 41 has been sufficiently evacuated, the switch S2 is actuated to close the contacts 37, 38 thereof and energize the motor M. The motor M drives the wiper blades 11, effects completion of the holding circuit through the contacts 141, 142 of the switch S3, and actuates the valve 133 to reset the time delay as described above.

If a longer interval between cycles of the wiper blades is desired, the knob K is rotated further in a clockwise direction, as indicated in FIG. 1, to reduce the tension of the spring 100 and increase the pressure at the output port 56 accordingly. The increase in pressure at the output port 56 causes the chamber 41 to be evacuated at a reduced rate to actuate the switch S2 a longer interval after actuation of the valve 133. If a shorter interval between cycles of the wiper blades 11 is desired, the knob K is rotated counter-clockwise as viewed in FIG. 1 to increase the tension of the spring 100 and decrease the pressure at the output port 56, which provides for an increased rate of evacuation of the cnamber 41 and a corresponding reduction in the interval between cycles of the windshield wiper.

As illustrated in FIG. 1, means 150 is provided for automatically effecting continuous running of the windshield wipers during rapid acceleration of the vehicle when the windshield wipers are set for intermittent running. The means 150 preferably includes a vacuum valve connected between the engine intake manifold and the coupling 60 which is effective to expose the chamber 41 to the pressure at the intake manifold of the engine by a substantially unrestricted flow path when the intake manifold pressure has increased toward atmospheric pressure a predetermined amount. Such an increase in intake manifold pressure results from "flooring" the accelerator pedal of the vehicle when passing etc., and when the vehicle is thus accelerated, the switch S2 is reclosed substantially immediately after operation of the valve 133 so that the windshield wipers operate continuously during the acceleration. When the acceleration of the vehicle is reduced, the vacuum valve of the means 150 closes off communication between the chamber 41 and the intake manifold so that the switch S2 is operated solely from the regulating means 20 at the desired intermittent run setting.

The vacuum valve of the means 150 may be of any suitable construction, but in the preferred embodiment, the valve is of substantially the same construction as the regulator means 20 except that an internal spring, equivalent to the spring 100 is employed therein, and the output and vacuum source connections are reversed.

It can now be seen that a new and improved variable time delay mechanism has been provided wherein a windshield wiper of a vehicle may be intermittently operated at controllable intervals by means of a vacuum regulated timing mechanism including a vacuum regulator, a variable volume chamber communicating with the vacuum regulator, and effective to close contacts of a switch in an energization circuit for a windshield wiper motor and wherein the variable volume chamber is vented in response to operation of the motor to open the contacts of the aforementioned switch to interrupt the energizing circuit for the motor.

While but a single embodiment of the present invention has been illustrated and described herein in considerable detail, the present invention is not to be considered to be limited to the precise construction shown. It is my intention to cover hereby all adaptations, modifications and uses of the present invention which come within the scope of the appended claims.

I claim:

1. A time delay mechanism for effecting operation of a servomechanism at controllable intervals comprising, a source of fluid pressure, regulator means connected to said source and operative to provide a variably controllable regulated pressure at an output port thereof and including a part which is moved to vary said regulated pressure, means defining a variable volume chamber including a chamber wall member movable in response to differential pressure forces acting thereon, conduit means for communicating said output port of said regulator means and said chamber including flow restrictor means for impeding fluid flow in said conduit means to gradually equalize fluid pressures at said output port and in said chamber and establish a differential pressure force on said movable member, an actuating member associated with said chamber wall member and movable in response to movement of said wall member to a position wherein operation of said servomechanism is initiated, and valve means communicating with said chamber including a valve member actuated in response to operation of said servomechanism to eliminate said differential pressure force acting on said wall member and effect movement of said actuating member away from said position.

2. A time delay mechanism as defined in claim 1 and further including a cam surface engaging said part of said regulator means and manually moved relative to said part for adjusting said regulated pressure and varying said interval.

3. A time delay mechanism as defined in claim 1 wherein said valve means further includes biasing means for urging said valve member to a close position wherein said differential pressure force on said wall member is maintained and wherein said servomechanism includes a valve actuating member operatively associated with said valve member to overcome the force of said biasing means and move said valve member away from said closed position.

4. A time delay as defined in claim 1 wherein said servomechanism is electrically energized and said actuating member associated with said wall member is moved to close contacts of a switch and establish an energizing circuit for said servomechanism.

5. A time delay mechanism as defined in claim 4 and further including a second switch having contacts which are opened in reesponse to completion of a cycle of operation of said servomechanism to interrupt an energizing circuit for said servomechanism.

6. A time delay mechanism as defined in claim 5 wherein said contacts of said first switch are opened in response to movement of said valve member to an open position, said contacts of said second switch maintaining said energizing circuit of said servomechanism completed during completion of a cycle of operation of said servomechanism.

7. A time delay mechanism as defined in claim 6 wherein said contacts of said second switch are associated with a cam member driven from said motor, said cam member including a lobe portion for opening said contacts when said servomechanism completes a cycle of operation.

8. A vacuum pressure operated time delay mechanism for providing intervals between operating cycles of an electrically energized motor and comprising a vacuum regulator communicating with a source of vacuum pressure and having an output port, means defining a chamber including a movable member forming a wall of said chamber exposed to atmospheric pressure at one side thereof and fluid pressure in said chamber at an opposite side, conduit means communicating said chamber and said output port including a flow restrictor for gradually reducing the pressure in said chamber to establish a differential pressure on said wall member urging said movable wall member into said chamber, switch means in said chamber having contacts which are closed in response to a predetermined amount of movement of said wall member to complete an energizing circuit of said motor, valve means having a valve member movable in response to operation of said motor to vent said chamber to atmosphere and effect opening of said contacts of said switch means, second switch means having contacts which are closed in response to operation of said motor for establishing an energizing circuit for said motor before said contacts of said first switch means are opened, and means for opening said contacts of said second switch means at the completion of an operating cycle of said motor to de-energize said motor.

9. A time delay mechanism as defined in claim 8 wherein said vacuum regulator is associated with a manually movable cam member for adjustably moving a part of said regulator to vary the vacuum pressure at said output port and change the interval between cycles of said motor.

10. A time delay mechanism as defined in claim 9 wherein and further including a manually operated control switch drivingly connected to said cam member including first and second contacts closed to connect said first switch means to a power supply, said first and second contacts maintained in engagement as said cam member is adjusted to change said interval, and a third contact engageable by one of said first and second contacts to complete an energizing circuit for said motor to operate said motor through contiguous cycles of operation.

11. A windshield wiper for an automotive vehicle and comprising a wiper blade supported for cyclic movement on a windshield of the vehicle, means drivingly connected to said wiper blade for moving said wiper blade comprising an electrically energized motor, first switch means for completing an energizing circuit for said motor, said first switch means being opened during a cycle of said wiper blade, second switch means operated from said motor, said second switch means being closed during a cycle of said wiper blade and opened when said blade completes a cycle, an vacuum pressure operated actuating means for reclosing said first switch means to re-energize said motor a predetermined interval after completion of said cycle.

12. A windshield wiper as defined in claim 11 wherein said vacuum pressure operated actuating means includes vacuum regulator means connected to a source of vacuum pressure at an engine of said vehicle, and means forming a variable volume chamber communicating with an output port of said regulator means, and including a movable chamber wall portion for actuating said first switch means.

13. A windshield wiper as defined in claim 12 wherein said actuating means further includes a flow restriction between said chamber means and said regulator means, said flow restriction operatble to provide a gradual equalization of pressure at said output port and in said chamber.

14. A windshield wiper as defined in claim 12 and further including valve means operated by said electric motor and operable from a first closed position to a second open position to vent said chamber and open said first switch means a predetermined time after energization of said motor.

15. A windshield wiper as defined in claim 14 wherein said valve means is operated by said motor from said second position to said first position to reset said actuating means for a subsequent cycle of said windshield wiper after said pre-determined interval.

16. A windshield wiper as defined in claim 11 and further including means for effecting continuous operation of said wiper blade independently of said vacuum pressure operated actuating means in response to acceleration of said vehicle.

References Cited

UNITED STATES PATENTS

| | | | |
|---|---|---|---|
| 2,574,294 | 11/1951 | Sampson | 15—250.12 |
| 3,017,651 | 1/1962 | Bitzer et al. | 15—250.12 |
| 3,117,335 | 1/1964 | Oishei et al. | 15—250.21 |
| 3,118,164 | 1/1964 | Diebel et al. | 15—250.12 |
| 3,204,279 | 9/1965 | Bitzer et al. | 15—250.12 |
| 3,299,723 | 1/1967 | Bitzer et al. | 15—250.12 XR |

PETER FELDMAN, *Primary Examiner.*